United States Patent
Volkmann et al.

(10) Patent No.: US 10,854,035 B2
(45) Date of Patent: Dec. 1, 2020

(54) AUTOMATED PACKAGING SYSTEM FOR A SELF-SERVICE CUSTOM-FABRICATION KIOSK

(71) Applicant: THE HILLMAN GROUP, INC., Cincinnati, OH (US)

(72) Inventors: Andy Volkmann, Longmont, CO (US); Chris Lohmann, Boulder, CO (US); Michael Rosenblatt, Boulder, CO (US); Roberto Aimi, San Francisco, CA (US)

(73) Assignee: The Hillman Group, Inc., Cincinnati, OH (US)

( * ) Notice: Subject to any disclaimer, the term of this patent is extended or adjusted under 35 U.S.C. 154(b) by 0 days.

(21) Appl. No.: 16/293,891

(22) Filed: Mar. 6, 2019

(65) Prior Publication Data
US 2019/0279458 A1    Sep. 12, 2019

Related U.S. Application Data

(60) Provisional application No. 62/639,760, filed on Mar. 7, 2018.

(51) Int. Cl.
| | | |
|---|---|---|
| G06F 7/08 | (2006.01) | |
| G07F 17/00 | (2006.01) | |
| B23C 3/35 | (2006.01) | |
| B65B 5/04 | (2006.01) | |
| B29C 64/379 | (2017.01) | |
| G06Q 20/18 | (2012.01) | |

(52) U.S. Cl.
CPC ............ *G07F 17/0042* (2013.01); *B23C 3/35* (2013.01); *B29C 64/379* (2017.08); *B65B 5/04* (2013.01); *G06Q 20/18* (2013.01)

(58) Field of Classification Search
USPC .......................................................... 235/381
See application file for complete search history.

(56) References Cited

U.S. PATENT DOCUMENTS

| | | | | |
|---|---|---|---|---|
| 4,748,792 A | * | 6/1988 | Jeffrey .................. | B65B 63/024 53/116 |
| 5,282,347 A | * | 2/1994 | Cleine ..................... | B65B 25/24 53/204 |

(Continued)

OTHER PUBLICATIONS

Re-flex Carrier Tape Forming Machine, https://www.reflex-odt.com/, last visited Mar. 6, 2019 (6 pages).

(Continued)

*Primary Examiner* — Tuyen K Vo
(74) *Attorney, Agent, or Firm* — Finnegan, Henderson, Farabow, Garrett & Dunner LLP

(57) ABSTRACT

A self-service kiosk is disclosed. The self-service kiosk may have a housing, including a user interface. The user interface may receive from a user a selection of an item. The user interface may also receive from the user a payment for a purchase of the item. The self-service kiosk may include a fabrication system disposed within the housing. The fabrication system may fabricate the item selected by the user. The self-service kiosk may also include a packaging system. The packaging system may sealingly enclose the item in a package. Further, the self-service kiosk may include a bin that may dispense the package, including the item, to the user.

20 Claims, 8 Drawing Sheets

(56) References Cited

U.S. PATENT DOCUMENTS

| | | | |
|---|---|---|---|
| 8,979,446 B2 | 3/2015 | Freeman | |
| 9,558,236 B1* | 1/2017 | Hagen | B23C 3/35 |
| 2005/0045512 A1* | 3/2005 | Carroll, Jr. | B65D 81/05 |
| | | | 206/454 |
| 2005/0060960 A1* | 3/2005 | Sperry | B65B 9/026 |
| | | | 53/450 |
| 2006/0201116 A1* | 9/2006 | Smith | B29C 66/81241 |
| | | | 53/478 |
| 2010/0175352 A1* | 7/2010 | Soloman | B65B 57/18 |
| | | | 53/508 |
| 2011/0297691 A1* | 12/2011 | Freeman | B23C 3/35 |
| | | | 221/8 |
| 2013/0331976 A1* | 12/2013 | Freeman | G06Q 20/18 |
| | | | 700/117 |
| 2015/0307303 A1* | 10/2015 | Pereira | B30B 9/3082 |
| | | | 242/548.2 |
| 2016/0321600 A1* | 11/2016 | Abutbul | G06Q 10/083 |
| 2017/0083885 A1* | 3/2017 | Khadgi | G06Q 20/18 |
| 2018/0079015 A1* | 3/2018 | Marsh | B23Q 35/128 |
| 2019/0172041 A1* | 6/2019 | Hill | G06Q 20/18 |

OTHER PUBLICATIONS

V-Tek TM-700 Automatic Taping Machine, https://www.reflex-odt.com/, last visited Mar. 6, 2019 (2 pages).

* cited by examiner

AUTOMATED PACKAGING SYSTEM FOR A SELF-SERVICE CUSTOM-FABRICATION KIOSK

CROSS-REFERENCE TO RELATED APPLICATION

This application is based on and claims benefit of priority of U.S. Provisional Patent Application No. 62/639,760, filed Mar. 7, 2018, which is incorporated herein by reference.

TECHNICAL FIELD

The present disclosure relates generally to an automated packaging system and more particularly to an automated packaging system for a self-service custom-fabrication kiosk.

BACKGROUND

Self-service kiosks that perform a custom-fabrication task are becoming increasingly common. For example, kiosks that allow a user to duplicate keys or to create custom tags are often located in commercial or retail locations such as grocery of hardware stores, shopping malls, or airports. In a key duplication kiosk, for example, a user typically inserts an existing key and uses the kiosk to fabricate one or more duplicate keys. Thus, unlike traditional vending machines, which usually dispense pre-packaged products, the components of a self-service custom-fabrication kiosk must have direct physical access to any product (e.g. duplicate key) that the kiosk is creating and/or modifying. As a result, conventional self-service, custom-fabrication, kiosks such as automated key-duplication kiosks, dispense the finished product (e.g. key) with no additional packaging. For example, the duplicate keys are typically dispensed, in a key duplication kiosk, without any packaging to a bin, which the user may access to retrieve the fabricated keys.

In some instances, the commercial or retail location where the custom-fabrication kiosk is installed may require a user to pay for the fabricated item at a checkout counter or cash register instead of at the kiosk. Dispensing an unpackaged item from the kiosk in such situations can lead to an increased rate of theft of the fabricated product. Absence of packaging can also lead to an increased risk of product damage, for example, for duplicated keys that are painted, or when the kiosk fabricates more fragile products. In addition, due to the lack of packaging, there is no medium other than the product itself that may be used to print content such as branding information, warranty information, customer service information, or advertising. Thus, there is a need for providing a system and a method of enclosing a custom-fabricated item produced in a self-service kiosk in some protective packaging not only to protect the fabricated item but also to provide one or more surfaces that may be used for printing content relevant to the fabricated item.

The self-service kiosk and automated packaging system of the present disclosure solve one or more of the problems set forth above and/or other problems of the prior art.

SUMMARY

In one aspect, the present disclosure is directed to a self-service kiosk. The self-service kiosk may include a housing, including a user interface. The user interface may be configured to receive, from a user, a selection of at least one item and a payment for a purchase of the at least one item. The self-service kiosk may also include a fabrication system disposed within the housing. The fabrication system may be configured to fabricate the at least one item. The self-service kiosk may further include a packaging system. The packaging system may be configured to sealingly enclose the at least one item in a package. The self-service kiosk may include a bin configured to dispense the package, including the at least one item, to the user.

In yet another aspect, the present disclosure is directed to a method of packaging a custom-fabricated item. The method may include providing a self-service kiosk, including a user interface. The user interface may receive from a user a selection of at least one item. The method may also include receiving, via the user interface, a payment for the purchase of the at least one item. Further, the method may include fabricating the at least one item, using a fabrication system disposed within the kiosk. The method may include packaging the at least one item in a package, using a packaging system disposed in the kiosk. Additionally, the method may include dispensing the package to a bin in the kiosk, the bin being accessible by the user.

DETAILED DESCRIPTION

Figure 1:
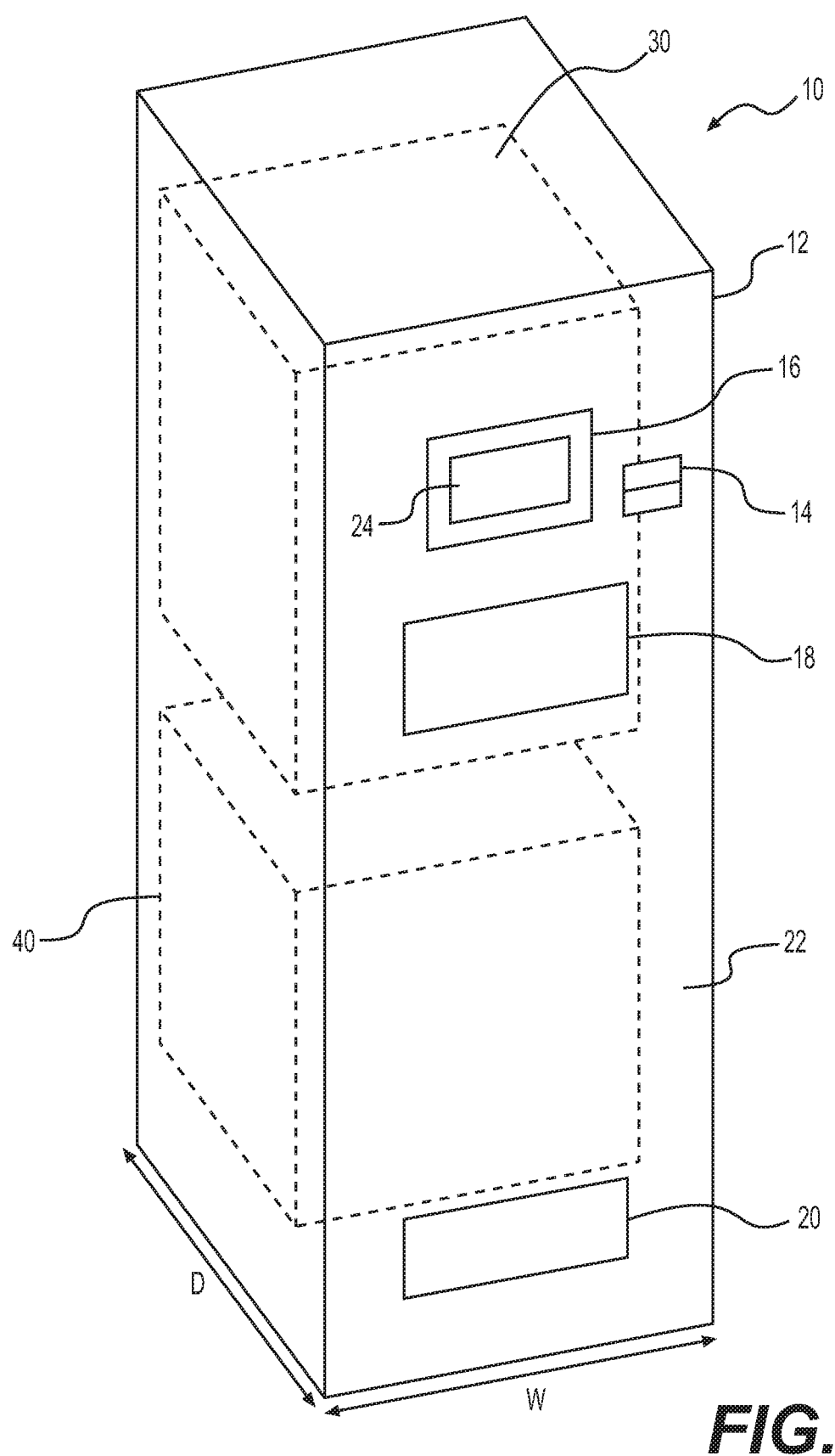
FIG. 1 is an illustration of an exemplary self-service kiosk, including an exemplary disclosed automated packaging system.

FIG. 1 illustrates an exemplary self-service kiosk 10. Kiosk 10 may be a small structure that may be configured to vend merchandise or to provide services. For example, kiosk 10 may be a self-service kiosk configured to allow a user to purchase one or more products. It is contemplated that kiosk 10 may be a custom-fabrication kiosk, which may be configured to fabricate one or more products, or to modify one or more products, using a variety of fabrication techniques. Kiosk 10 may have a size and shape similar to, for example, a telephone booth, an ATM machine, or a vending machine usually available at commercial or retail locations such as at grocery or hardware stores, shopping malls, or airports. In one exemplary embodiment, kiosk 10 may have a width "W" of about 35", a depth "D" of about 25", and may occupy a floor area of about 6 square feet to minimize the floor space occupied by kiosk 10 in the commercial or retail location. It is contemplated, however, that kiosk 10 may have dimensions different from those discussed above.

Kiosk 10 may include housing 12, payment device 14, display 16, viewing window 18, bin 20, fabrication system 30, and packaging system 40. Housing 12 of kiosk 10 may be in the form of an enclosure within which fabrication system 30 and packaging system 40 may be located. In one exemplary embodiment as illustrated in FIG. 1, housing 12 may have a generally cuboidal shape, although other shapes of housing 12 are also contemplated. Payment device 14 may be positioned on wall 22 or on an outside surface of housing 12. Payment device 14 may be a credit card or debit card reader. It is also contemplated that in some exemplary embodiments, payment device 14 may be configured to accept other types of payment such as currency, checks, or other forms of electronic payment. In some exemplary embodiments, payment device 14 may be configured to receive payment via wireless communication with another electronic device, for example, a mobile phone, a tablet computer, a laptop computer, a remote server, etc. Housing 12 may include a single payment device 14 that may be capable of receiving one or more types of payment described above. Alternatively, housing 12 may include more than one payment device 14, each of which may be capable of receiving a particular type of payment.

Display 16 may include a conventional display device, for example, an LCD screen, an LED screen, a cathode ray tube screen, etc. In some exemplary embodiments, display 16 may be configured to display a graphical user interface 24, including instructions, status of fabrication system 30 or packaging system 40, and/or advertising or other information. In some exemplary embodiments, display 16 may additionally or alternatively include a touch screen device configured to receive one or more inputs from a user. Thus, for example, graphical user interface 24 displayed on display 16 may allow a user to select an item for purchase using the touch screen. In some exemplary embodiments, graphical user interface 24 may be configured to display a virtual keyboard or numeric keypad, which may allow a user to enter payment information, address information, and/or other information associated with the purchase of a product from kiosk 10. In other exemplary embodiments, kiosk 10 may include input devices such as one or more physical keyboards, mice, joysticks, buttons, touch pads, etc., in addition to or instead of display 16. Thus, a user interface of kiosk 10 may include one or more of graphical user interface 24 and/or the above-described physical or virtual input devices. The user interface of kiosk 10 may allow kiosk 10 to receive inputs from a user. Additionally or alternatively, the user interface of kiosk 10 may include gesture sensing devices configured to allow a user to provide one or more inputs to kiosk 10.

Viewing window 18 may include an opening in housing 12, which may be covered with a transparent panel made of glass, plastic, or any other known transparent material. Viewing window 18 may allow a user to observe operation of one or more components of fabrication system 30 and/or packaging system 40. In some exemplary embodiments, viewing window 18 may include a display device similar to that of display 16 and may be configured to display the progress of a fabrication or packaging task performed by fabrication system 30 or packaging system 40, respectively. It is also contemplated that in some exemplary embodiments, kiosk 10 may not include viewing window 18.

Bin 20 may include a tray or an enclosure extending from or attached to an opening in wall 22 of housing 12. Bin 20 may be configured to receive a custom-fabricated item or product produced by kiosk 10 and dispense the item to a user. Bin 20 may be configured to receive a package, including the custom-fabricated item or product. Bin 20 may also be configured to allow a user to access and retrieve the custom-fabricated item from bin 20. In some exemplary embodiments, bin 20 may include a door (not shown) that may be locked during one or more operations performed by fabrication system 30 and/or packaging system 40. The door of bin 20 may be configured to be unlocked and opened after the custom-fabricated item or product has been dispensed in bin 20 by fabrication system 30 and/or packaging system 40 of kiosk 10.

Fabrication system 30 may be configured to produce a custom-fabricated item or product using one or more fabrication or machining techniques. For example, such fabrication or machining techniques may include processes such as cutting, drilling, polishing, milling, engraving, etc. Fabrication system 30 may be configured to perform these and other fabrication or machining processes to create one or more custom-fabricated items, using materials such as metal, wood, plastic, etc. Fabrication system 30 may be configured to produce one or more custom-fabricated giftable items. Such giftable items may include for example, keys, jewelry, tags, or other gift items. It is also contemplated that fabrication system 30 may be configured to modify or alter one or more characteristics (e.g. shape, size, color, appearance, etc.) of a pre-fabricated item or product that may be inserted into kiosk 10 by a user, or a pre-fabricated item stored in kiosk 10 and selected for purchase by the user. In one exemplary embodiment, fabrication system 30 may include a key fabrication system that may be configured to produce one or more duplicate keys corresponding to a key inserted into kiosk 10. An exemplary fabrication system for producing one or more duplicate keys is disclosed in U.S. Pat. No. 8,979,446, which is incorporated herein by reference in its entirety. In another exemplary embodiment, fabrication system 30 may include an engraving machine configured to engrave blank pieces of material (e.g. metal, wood, plastic) with letters, symbols, or figures to produce one or more tags that may be attached to, for example, pet collars, luggage, etc. In yet another exemplary embodiment, fabrication system 30 may include a 3D material printer configured to produce a custom-fabricated item or product by a method of 3D printing. For example, such 3D printed items may include jewelry, hardware components (e.g. nuts, bolts, washers, etc.), a tag, a key, or any other item that may be produced using 3D printing techniques. By way of another example, fabrication system 30 may include a laser cutter configured to perform one or more machining operations to produce a custom-fabricated item or product.

Packaging system 40 of kiosk 10 may be configured to receive one or more custom-fabricated items or products from fabrication system 30. In some exemplary embodiments, packaging system 40 may be configured to receive one or more pre-fabricated items obtained from a user or retrieved from a storage area within kiosk 10. For example, kiosk 10 may be configured to store one or more pre-fabricated gift items that a user may be able to purchase using display 16 and/or payment system 14 of kiosk 10. Packaging system 40 may be configured to automatically package the user-selected pre-fabricated or custom-fabricated item by enclosing the received items into one or more packages, and to dispense the one or more packages into bin 20 of kiosk 10. As illustrated in the exemplary embodiment of FIG. 1, packaging system 40 may be located within housing 12 of kiosk 10.

Figure 2:
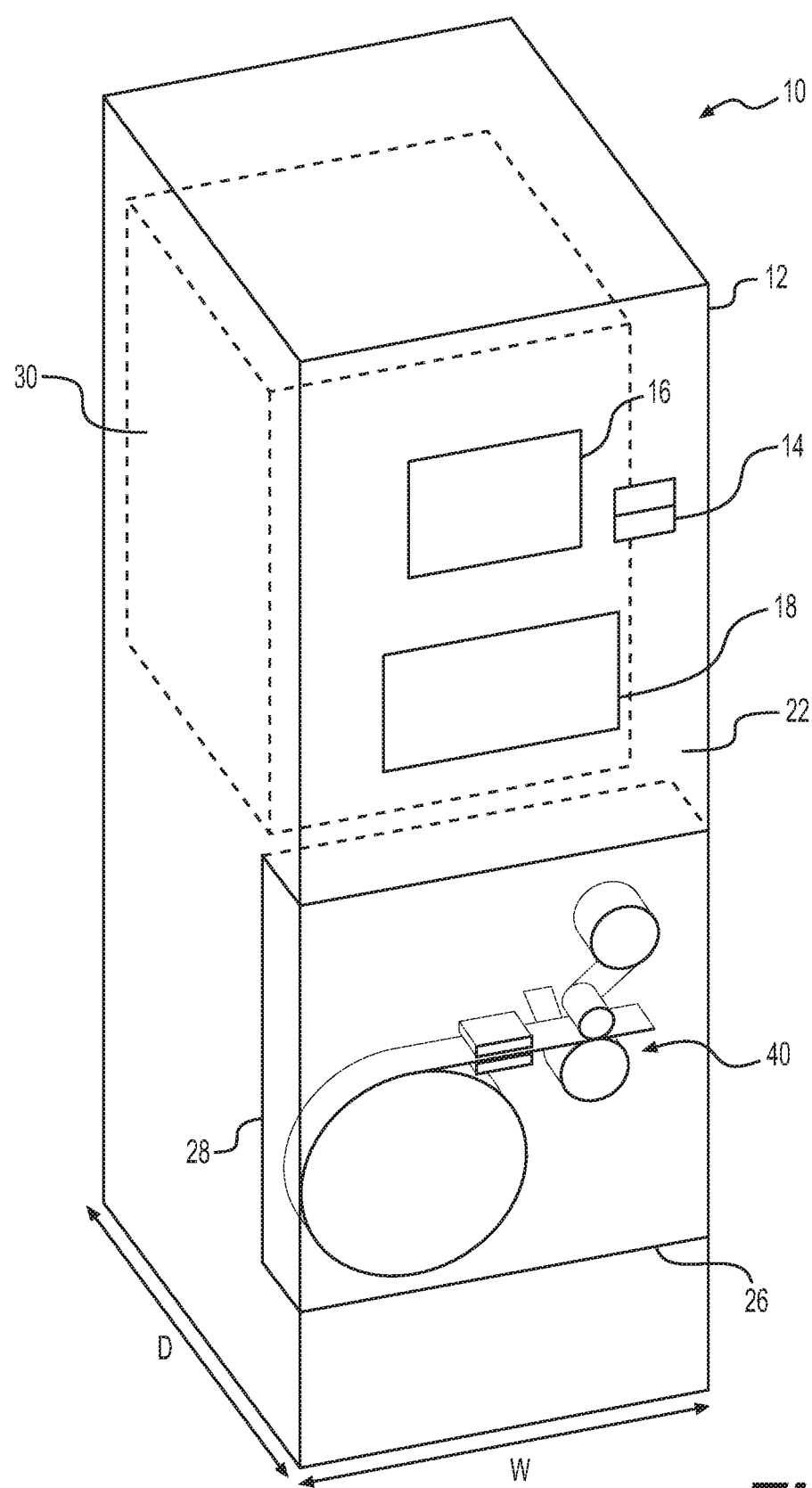
FIG. 2 is an illustration of another exemplary self-service kiosk including the exemplary disclosed automated packaging system of FIG. 1 attached to a door of the kiosk.

FIG. 2 illustrates another exemplary embodiment of self-service kiosk 10. Many of the features of kiosk 10 illustrated in the FIG. 2 are similar to the features illustrated in the FIG. 1 and described above. Only features of kiosk 10 that may be different in the embodiment of FIG. 2 are described below. As illustrated in the FIG. 2, kiosk 10 may include door 26, which may be disposed on wall 22 of housing 12. Door 26 of kiosk 10 may be connected to a remainder of housing 12 at edge 28. In one exemplary embodiment, edge 28 may include one or more hinges and/or pivotal connections that may allow door 26 to be rotatably opened. As also illustrated in the exemplary embodiment of FIG. 2, packaging system 40 may be attached to and/or may be fully contained within door 26. It is contemplated, however, that in other exemplary embodiments, some portions of packaging system 40 may be attached to door 26 while other portions of packaging system 40 may be disposed outside door 26 and within housing 12.

Figure 3:
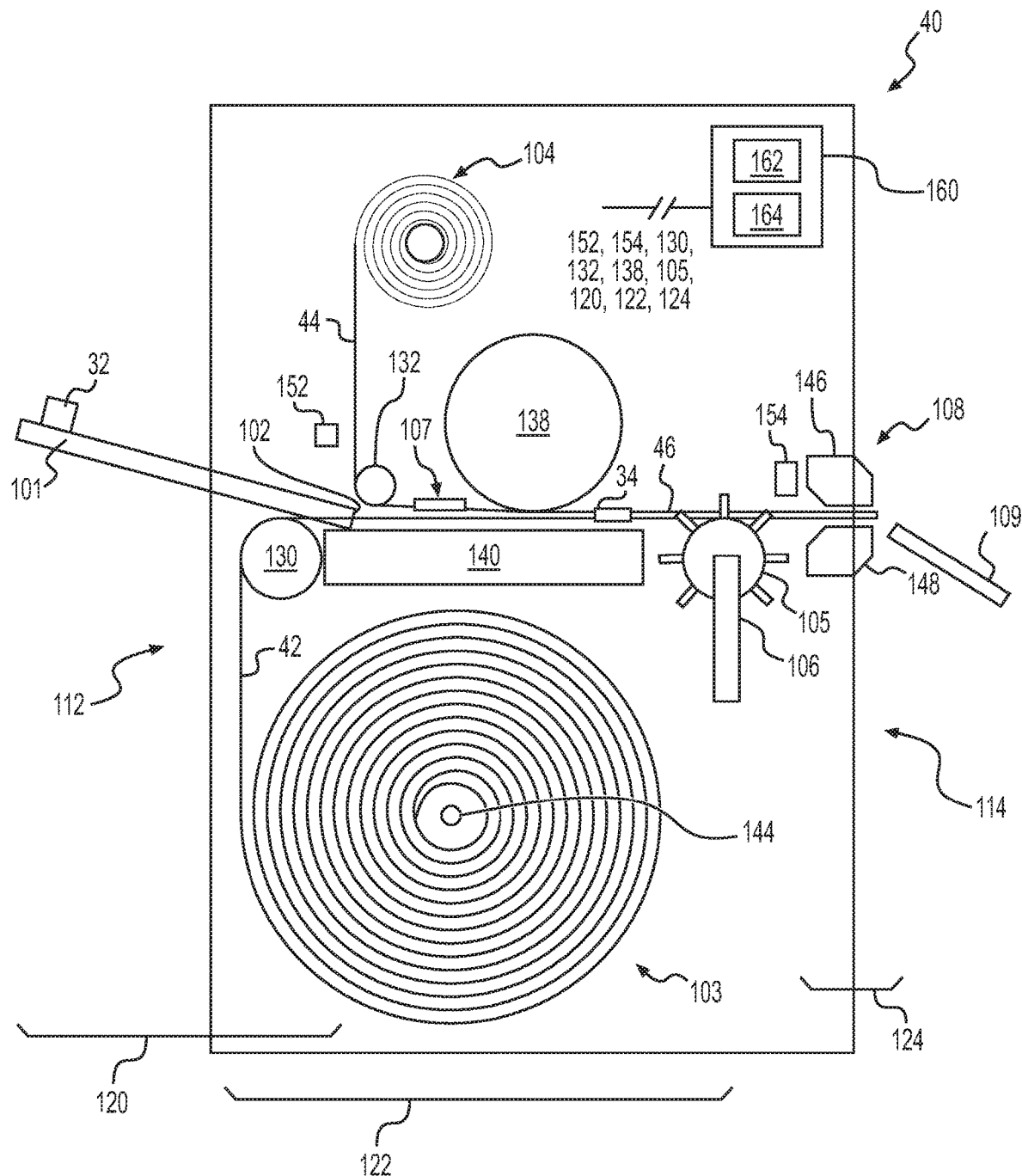
FIG. 3 is a schematic illustration of an exemplary disclosed automated packaging system for the kiosk of FIG. 1.

FIG. 3 illustrates a schematic diagram of an exemplary automated packaging system 40 that may be included in self-service kiosk 10. As illustrated in FIG. 3, packaging system 40 may extend, for example, along a width W of kiosk 10 from adjacent first side 112 of kiosk 10 to adjacent second or opposite side 114 of kiosk 10. Packaging system 40 may be configured to receive item (or product) 32 from fabrication system 30, to automatically enclose received item 32 in package 34, and dispense package 34 to bin 20. For example, packaging system 40 may be configured to form package 34 using base packaging consumable 42 and top packaging consumable 44 within kiosk 10 such that item 32 may be sealingly enclosed within package 34. For example, base packaging consumable 42 and top packaging consumable 44 may be sealingly attached together, forming package tape 46, which may include a single package 34 or a plurality of adjacently disposed and connected packages 34.

As illustrated in the exemplary embodiment of FIG. 3, packaging system 40 may include item receiving station 120, packaging station 122, and package delivery station 124 disposed in a sequential order within kiosk 10. Feeder rollers 130 and 132 positioned between item receiving station 120 and packaging station 122 may be configured to help move base packaging consumable 42 and top packaging consumable 44 in a direction from adjacent first side 112 to adjacent second side 114. As illustrated in FIG. 3, sprocket 105 (or package tape roller 105) positioned between packaging station 122 and package delivery station 124 may also be configured to move package tape 46 in a direction from adjacent first side 112 to adjacent second side 114. It will be understood that because package tape 50 may be attached to base packaging consumable 42 and top packaging consumable 44 may also move in a direction from adjacent first side 112 to adjacent second side 114 when sprocket 105 moves package tape 46.

Sprocket 105 may be configured to move package tape 46 in a direction from side 112 toward side 114 of packaging system 40. Motor 106 may be configured to rotate sprocket 105. Motor 106 may be an electric motor, which may receive power from one or more power supplies located within or external to kiosk 10. In some exemplary embodiments, base packaging consumable 42 and top packaging consumable 44 may include evenly or unevenly spaced notches or openings 134 (see FIG. 5). Openings 134 may be circular, elliptical, polygonal, or may have any other geometrical shape and size compatible with sprocket 105. Sprocket 105 may be configured to engage with openings 134 such that rotation of sprocket 105 by motor 106 may cause package tape 46 to travel in a direction from adjacent first side 112 towards second side 114 of packaging system 40. Like sprocket 105, feeder rollers 132 and 134 may also include associated motors (not shown) that may cause rotation of feeder rollers 132 and 134. Furthermore, in some exemplary embodiments, feeder rollers 132 and 134 may also be in the form of sprockets that may engage with openings 134 to cause base packaging consumable 42 and top packaging consumable 44 to travel in a direction from adjacent first side 112 towards second side 114 of packaging system 40. It is contemplated, however, that in some exemplary embodiments, base packaging consumable 42 and top packaging consumable 44 may not include openings 134. In this configuration, feeder roller 132, feeder roller 134 and sprocket 105 may be friction rollers that may be configured to move base packaging consumable 42, top packaging consumable 44, and package tape 46 by due to frictional contact with base packaging consumable 42, top packaging consumable 44, and package tape 46, respectively. Although FIG. 3 illustrates sprocket 105, it is contemplated that in some exemplary embodiments, sprocket 105 may take the form of a roller (e.g. package tape roller 105), which may be configured to move package tape 46 by making frictional contact with package tape 46.

Item receiving station 120 may include chute 101 that may be configured to receive item 32 and deliver item 32 to a predetermined location within packaging system 40. As discussed above, item 32 may be a pre-fabricated item provided by a user or stored in a storage location within kiosk 10, or may be a custom-fabricated item produced or modified by fabrication system 30. Chute 101 may receive item 32 from fabrication system 30, from a user, or from a storage location in kiosk 10. Chute 101 may be configured to transport one or more items 32 to packaging station 122. In one exemplary embodiment, chute 101 may include a U-shaped rail that may allow item 32 to slide and/or roll down chute 101 to packaging station 122. It is contemplated, however, that chute 101 may instead include a flat sloping surface, or a belt or chain driven conveyer type arrangement, etc. to allow item 32 to be delivered via delivery end 102 of chute 101 to packaging station 122.

Figure 4:
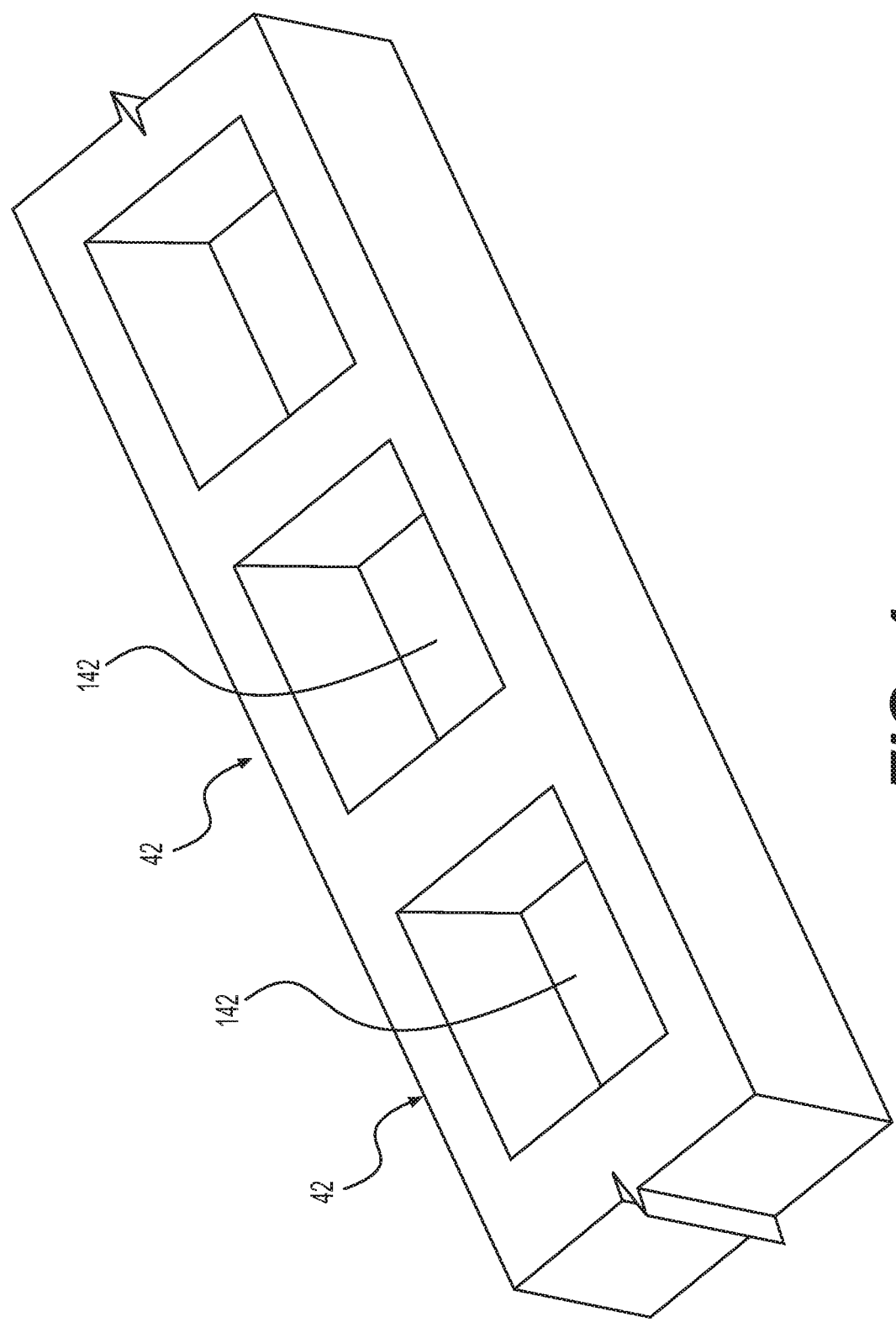
FIG. 4 is an illustration of an exemplary carrier tape including pre-formed base packaging consumables for the automated packaging system of FIG. 3.

Packaging station 122 may include spool 103, spool 104, heater 107, compression roller 138, and support platform 140. Spool 103 may be disposed on one side of chute 101 and adjacent first side 112. For example, as illustrated in FIG. 3, spool 103 may be disposed below chute 101. It is contemplated, however, that that in some exemplary embodiments spool 103 may be located laterally to one side of chute 101, above chute 101, or anywhere else within kiosk 10. Spool 103 may be configured to store and supply base packaging consumable 42, which may form a first portion of package 34. Base packaging consumable 42 may be stored in the form of a carrier tape, which may be wound on spool 103. Base packaging consumable 42 may be configured to travel from spool 103 over feeder roller 130 and in a direction from adjacent first side 112 toward second side 114. In one exemplary embodiment as illustrated in FIG. 4, base packaging consumable 42 may include a plurality of recesses or hollow enclosures 142 disposed adjacent to each other and connected to each other in the form of the carrier tape. It is contemplated, however, that in some exemplary embodiments, base packaging consumable 42 may be stored in kiosk 10 in the form of a generally flat carrier tape, which may not include recesses 142.

Returning to FIG. 3, spool 103 may revolve around spindle 144, which may be configured to support one or more spare spools 103 of base packaging consumable 42 in addition to a primary spool 103 that may be currently used to create packages 34. Packaging system 40 may be configured to automatically use base packaging consumable 42 from a spare spool 103 when the primary spool 103 is exhausted (i.e. runs out of base packaging consumable 42). For example, packaging system 40 may include one or more arms or mechanical devices (not shown) that may be configured to automatically retrieve base packaging consumable 42 from a spare spool 103 when the primary spool 103 is exhausted. Although FIG. 3 illustrates base packaging consumable 42 stored in the form of spool 103, it is contemplated that in some exemplary embodiments, base packaging consumable 42 may be stored within kiosk 10 in the form of a folding stack instead of being wound on spool 103.

Support platform 140 may extend from adjacent delivery end 102 of chute 101 to adjacent sprocket 105. Support platform 140 may be configured support and/or position one or more of the recesses 142 of base packaging consumable 42 adjacent to delivery end 102 of chute 101. Chute 101 may be configured to dispense item 32 into recess 142 of base packaging consumable 42 positioned adjacent delivery end 102 of chute 101.

Spool 104 may be positioned on an opposite side of chute 101 as compared to spool 103. For example as illustrated in FIG. 3, spool 104 may be positioned above chute 101, although it is contemplated that spool 104 may be positioned below chute 101, laterally to one side of chute 101 and opposite spool 103, or anywhere else within kiosk 10. Spool 104 may be configured to store and supply top packaging consumable 44, which may form a second portion of package 34. Top packaging consumable 44 may be wound on spool 104. Top packaging consumable 44 may travel from spool 104 and over feeder roller 132 so as to be positioned above or adjacent to at least one of the recesses 142 of base packaging consumable 42. In one exemplary embodiment, top packaging consumable 44 may be in the form of a generally flat cover tape. In another exemplary embodiment, top packaging consumable 44, like base packaging consumable 42, may include a plurality of recesses connected to each other in the form of a tape. It is also contemplated that in some exemplary embodiments, top packaging consumable 44 may be stored within kiosk 10 in the form of a folding stack instead of being wound on spool 104.

In one exemplary embodiment, one or both of base packaging consumable 42 and top packaging consumable 44 may include an adhesive layer. The adhesive layer may be configured to help sealingly attach one or more surfaces of base packaging consumable 42 and top packaging consumable 44 to form package 34. For example, as illustrated in FIG. 3, compression roller 138 and support platform 140 may help compress top packaging consumable 44 and base packaging consumable 42, allowing the adhesive layer to sealingly attach top packaging consumable 44 and base packaging consumable 42, forming package 34.

Although one or both of base packaging consumable 42 and top packaging consumable 44 have been described above as including an adhesive layer, it is contemplated that in some embodiments, such an adhesive layer may not be present. Instead, in these exemplary embodiments, one or both of base packaging consumable 42 and top packaging consumable 44 may be made of, for example, thermoplastic material that may be configured to soften and/or melt when subjected to heating. Packaging system 40 may include heater 107, which may include one or more heating elements, which may be configured to heat one or both of base packaging consumable 42 and top packaging consumable 44. In one exemplary embodiment as illustrated in FIG. 3, heater 107 may be positioned adjacent top packaging consumable 44. It is contemplated, however, that heater 107 may be positioned adjacent base packaging consumable 42. Additionally or alternatively, packaging system 40 may include more than one heater 107 such that heater s107 may be positioned adjacent both base packaging consumable 42 and top packaging consumable 44. Heater 107 may be configured to heat one or both of base packaging consumable 42 and top packaging consumable 44 such that the thermoplastic material of base packaging consumable 42 and or top packaging consumable 44 may soften and/or melt.

Compression roller 138 and support platform 140 may help compress and sealingly attach the softened base packaging consumable 42 and/or top packaging consumable 44 to each other, forming package 34. One or both of compression roller 138 and support platform 140 may be movable such that a gap between compression roller 138 and support platform 140 may be varied. Compression roller 138 and/or support platform 140 may compress base packaging consumable 42 and/or top packaging consumable 44 by reducing the gap between compression roller 138 and support platform 140 to a dimension smaller than a combined thickness of base packaging consumable 42 and top packaging consumable 44. Although packaging system 40 has been described above as including heater 107, it is contemplated that in some exemplary embodiments, packaging system 40 may not include heater 107. Instead, outer surface or an entirety of compression roller 138 and/or support platform 140 may include heaters configured to heat outer surface of compression roller 138 and/or support platform 140. The heated outer surfaces of one or both of compression roller 138 and support platform 140 may help to heat and soften or melt top packaging consumable 44 and/or base packaging consumable 42, respectively. Compression roller 138 and support platform 140 may also help compress and sealingly attach the softened base packaging consumable 42 and/or top packaging consumable 44 to each other, forming package 34. As discussed above, sprocket 105 may cause package tape 46, including one or more of packages 34 to move in a direction from adjacent first side 112 towards second side 114.

Package delivery station 124 may include cutter assembly 108 and delivery chute 109. Cutter assembly 108 may include upper cutter 146 and lower cutter 148. Upper and lower cutters 146 and 148 may be positioned adjacent side 114 of packaging system 40. Upper and lower cutters 146 and 148 may be configured to create perforated tear lines 150 (see FIG. 5) along a width "Wp" of package tape 46 and on either side of package 34. Upper and lower cutters 146 and 148 may also be configured to cut or sever package 34 from package tape 46. The one or more severed packages 34 may travel over delivery chute 109 to bin 20 of kiosk 10. Delivery chute 109 may have a structure and functions similar to that of, for example, chute 101 discussed above. Although FIG. 3 illustrates both upper and lower cutters 146 and 148, it is contemplated that some exemplary embodiments may include only one of cutters 146 and 148.

Packaging system 40 may also include one or more sensors 152 and 154. In one exemplary embodiment as illustrated in FIG. 3, sensor 152 may be positioned adjacent a delivery end 102 of chute 101. Sensor 152 may be configured to detect whether item 32 is present in recess 142 of base packaging consumable 42 when recess 142 is positioned adjacent delivery end 102 of chute 101. As also illustrated in FIG. 3, sensor 154 may be positioned between packaging station 122 and package delivery station 124. Sensor 154 may be configured to detect whether package 34 is present adjacent cutter assembly 108. Sensors 152 and 154 may include LED break beam sensors, single pixel time of flight sensors, position sensors, range finders, cameras, etc. In one exemplary embodiment, sensors 152 and/or 154 may be configured to detect a position of one or more of base packaging consumable 42, top packaging consumable 44, and/or package tape 46 based on one or more index marks present on base packaging consumable 42 and/or top packaging consumable 44. Although only two sensors 152 and 154 are illustrated in FIG. 3, it is contemplated that kiosk 10 may include any number of sensors similar to sensors 152 and/or 154. It is further contemplated that the one or more sensors 152 and/or 154 may be located anywhere within kiosk 10.

Kiosk 10 may also include controller 160, which may be configured to control operations of fabrication system 30 and/or packaging system 40 of kiosk 10. Controller 160 may include one or more processors 162 and/or one or more memory devices 164. Controller 160 of packaging system 40 may be configured to receive and/or send signals to one or more of sprocket 105, motor 106, cutter assembly 108, feeder rollers 130 and 132, compression roller 138, sensors 152 and 154, and/or other components of packaging station 122 and delivery station 124. Controller 160 may be configured to receive and/or send signals through one or more wired connections or wirelessly.

Processor 162 may embody a single or multiple microprocessors, digital signal processors (DSPs), etc. Numerous commercially available microprocessors may be configured to perform the functions of processor 162. Various other known circuits may be associated with processor 162, including power supply circuitry, signal-conditioning circuitry, and communication circuitry.

The one or more memory devices 164 may store, for example, data and/or one or more control routines or instructions for processing the one or more signals received from sensors 152 and 154, and/or to control operations of one or more components of packaging system 40. Memory device 164 may embody non-transitory computer-readable media, for example, Random Access Memory (RAM) devices, NOR or NAND flash memory devices, and Read Only Memory (ROM) devices, CD-ROMs, hard disks, floppy drives, optical media, solid state storage media, etc. Controller 160 may receive one or more input signals from the one or more sensors 152 and 154 and may execute the routines or instructions stored in the one or more memory devices 164 to generate and deliver one or more command signals to one or more of sprocket 105, motor 106, cutter assembly 108, feeder rollers 130 and 132, compression roller 138, and/or other components of packaging station 122 and delivery station 124.

It is contemplated that in some exemplary embodiments, one or more of feeder rollers 130, 132, and/or compression roller 138 may take the form of sprockets and packaging system 40 may not include sprocket 105. Such a configuration may help reduce an overall width of packaging system 40, which in turn may help reduce an amount of material loss (i.e. of base packaging consumable 42 or top packaging consumable 44 between compression roller 138 and cutter assembly 108. Additionally, although, FIG. 3 illustrates one each of various components, it is contemplated that packaging system 40 may include only some of the components described above and illustrated in FIG. 3. It is further contemplated that packaging system 40 may include any number of each of the various components (e.g. spools 103, 104, feeder rollers 130, 132, heater 107, etc.).

In operation, chute 101 may deliver item 32 to recess 142 of base packaging consumable 42 via discharge end 102. Sensor 152 may detect the presence of item 32 in recess 142 of packaging consumable 42 positioned adjacent delivery end 102 of chute 101. Sensor 152 may send a signal to controller 160 when it detects the presence of item 32. Controller 160 may direct one or more of feeder rollers 130 and/or sprocket 105 to rotate such that recess 12 containing item 32 is positioned adjacent to or below heater 107. Controller 160 may also direct feeder roller 132 to rotate and help position top packaging consumable 44 adjacent to (e.g. above) base packaging consumable 42 containing item 32. Controller 160 may also direct one or more of feeder rollers 130 and 132, and/or sprocket 105 to rotate such that the heated base packaging consumable 42 and/or top packaging consumable 44 pass between compression roller 138 and support platform 140, causing base packaging consumable 42 and top packaging consumable 44 to be sealingly attached to each other, forming package 34. Sensor 154 may detect the presence of package 34 adjacent cutter assembly 108. Sensor 154 may send a signal to controller 160 when it detects the presence of package 34. Controller 160 may send signals to upper and lower cutters 146 and 148, which in turn may generate tear lines 150 on either side of package 34 and may further sever package 34, allowing package 34 to be delivered to bin 20 via delivery chute 109.

Figure 5:
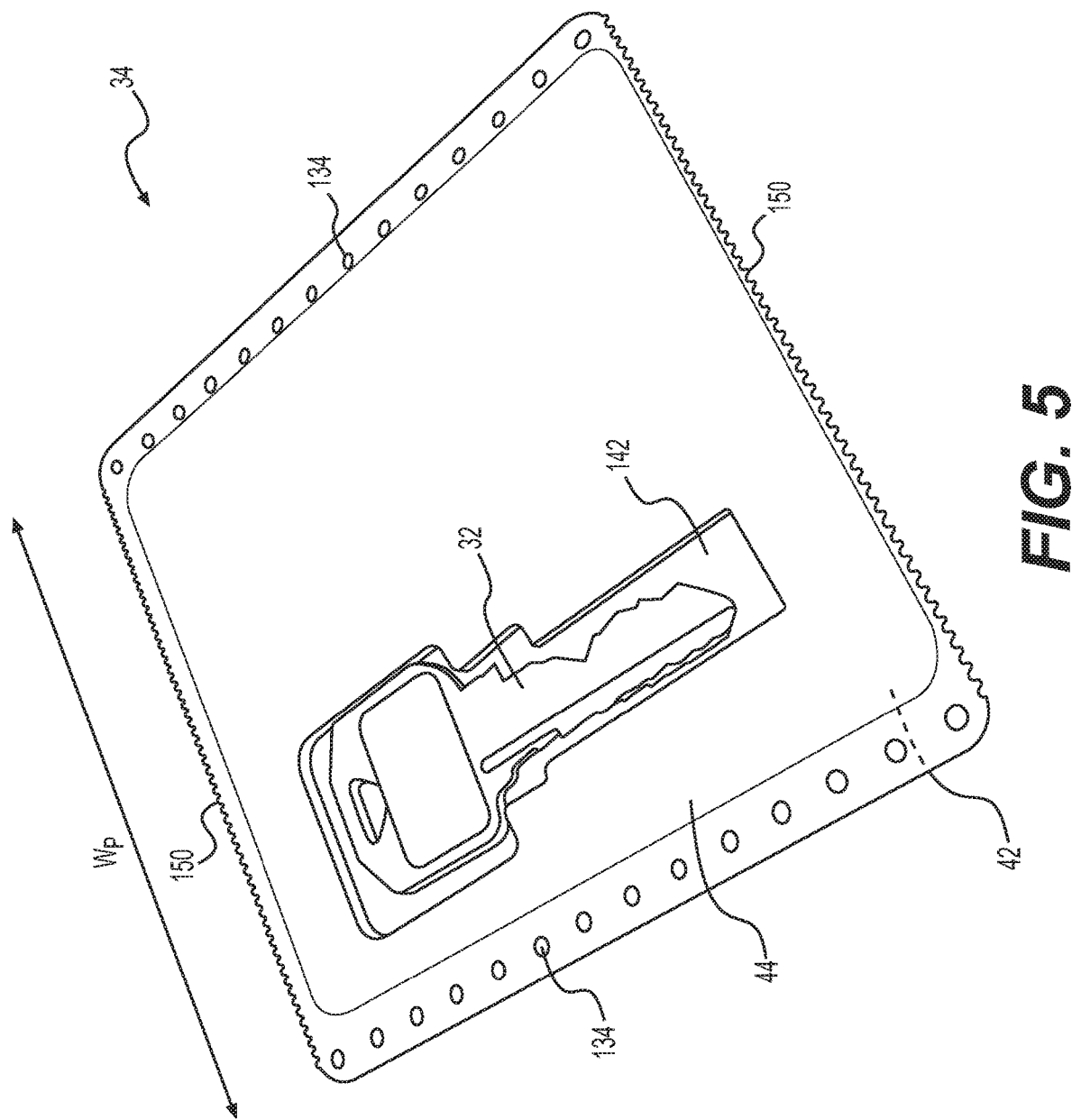
FIG. 5 is an illustration of an exemplary package produced by the exemplary disclosed automated packaging systems of FIG. 4.

FIG. 5 illustrates an exemplary embodiment of package 34 that may be produced by packaging system 40. As illustrated in FIG. 5, package 34 may include base packaging consumable 42, including recess 142. Although only one recess 142 is illustrated in FIG. 5, it is contemplated that based packaging consumable 42 in package 34 may include more than one recess 142. Item 32 (e.g. key) may be placed within recess 142. Package 34 may also include top packaging consumable 44 that may cover recess 142 and other portions of base packaging consumable 42. As illustrated in FIG. 5, base packaging consumable 42 and top packaging consumable 44 may be sealingly attached to each other so that item 32 may be enclosed within package 34. As also illustrated in FIG. 5, package 34 may include tear lines 150 running across a width of package 34 and disposed on either side of package 34.

Figure 6:
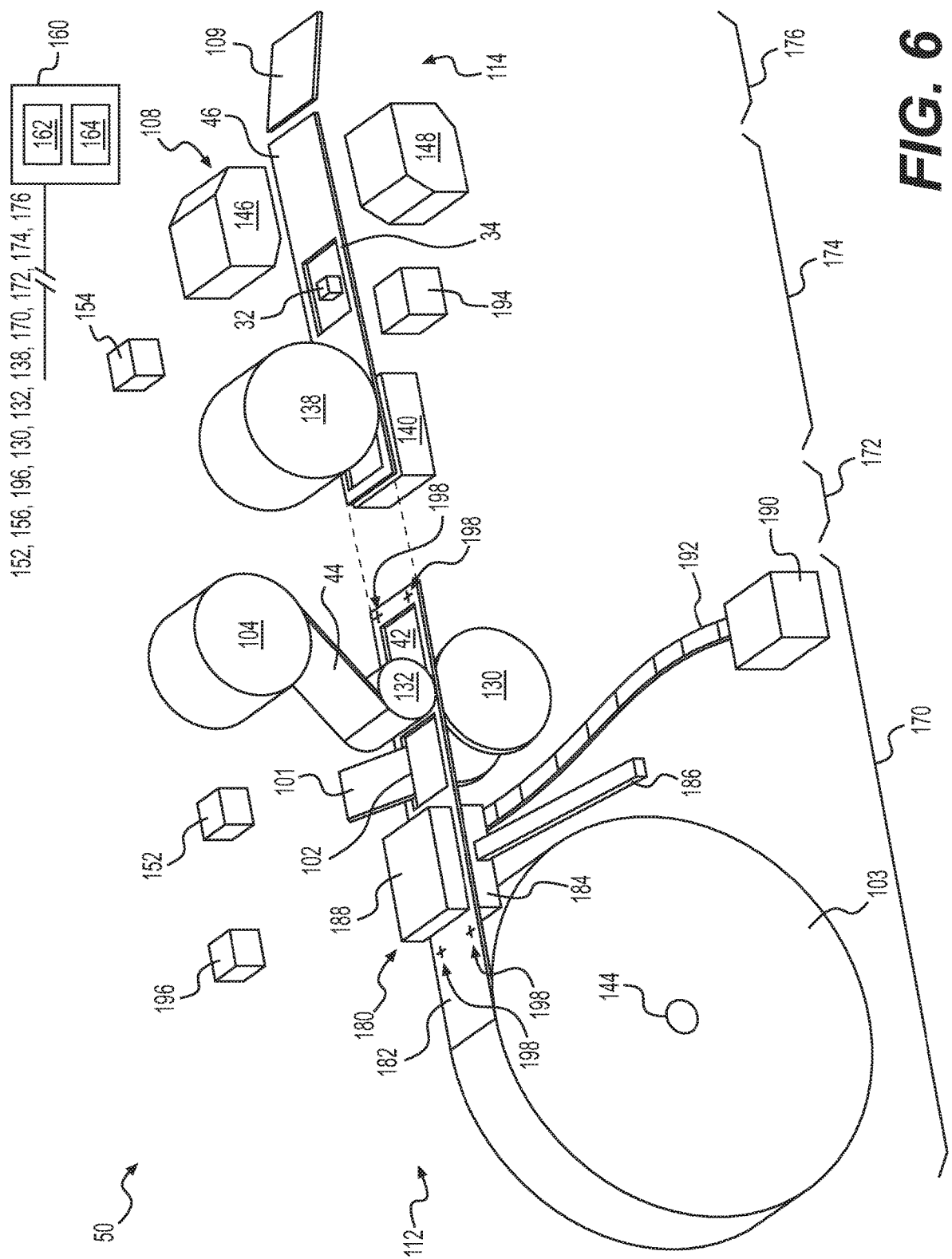
FIG. 6 is a schematic illustration of another exemplary disclosed automated packaging system for the self-service kiosk of FIG. 1.

FIG. 6 illustrates a schematic diagram of another exemplary automated packaging system 50 that may be included in kiosk 10. Packaging system 50 may include components similar to those described above with respect to packaging system 40 of FIG. 3. For example, like packaging system 40, packaging system 50 may also include chute 101, spool 104 with top packaging consumable 44, cutter assembly 108, delivery chute 109, compression roller 138, support platform 140, and sensors 152 and 154. The structure and/or function of these components of packaging system 50 may be similar to the structure and/or function of these components described above with respect to packaging system 40. Only components of packaging system 50 different from those of packaging system 40 are described below.

As illustrated in FIG. 6, packaging system 50 may extend from adjacent first side 112 of kiosk 10 to adjacent second or opposite side 114 of kiosk 10. Packaging system 50 may be configured to receive item (or product) 32 from fabrication system 30, to automatically enclose received item 32 in package 34, and dispense package 34 to bin 20. For example, packaging system 50 may be configured to form package 34 using base packaging consumable 42 and top packaging consumable 44 within kiosk 10 such that item 32 may be sealingly enclosed within package 34. Base packaging consumable 42 and top packaging consumable 44 may be sealingly attached together, forming package tape 46, which may include a single package 34 or a plurality of packages 34.

As illustrated in the exemplary embodiment of FIG. 6, packaging system 50 may include base forming station 170, item receiving station 172, packaging station 174, and package delivery station 176 disposed in a sequential order in a direction from first side 112 towards second side 114. Feeder rollers 130 and 132 positioned between item receiving station 120 and packaging station 122 may be configured to help move base packaging consumable 42 and top packaging consumable 44 in a direction from adjacent first side 112 to adjacent second side 114. It is contemplated, however, that one or both of feeder rollers 130 and 132 may be positioned between any of base forming station 170, item receiving station 172, packaging station 174, and package delivery station 176.

Base forming station 170 may include spool 103 and mold assembly 180. Spool 103 of packaging system 50 may be configured to store and supply carrier tape 182, which may be generally flat. In one exemplary embodiment, carrier tape 182 may be made of, for example, thermoplastic material. Carrier tape 182 may be configured to travel over feeder roller 130, which may be configured to cause carrier tape 182 to travel in a direction from adjacent side 112 toward side 114. As illustrated in the exemplary embodiment of FIG. 6, feeder roller 130 may be a friction roller, which may be configured to move carrier tape 182 by frictional contact with carrier tape 182. It is contemplated, however, that in some exemplary embodiments, carrier tape 182 may include one or more openings 134 (see FIG. 5) adjacent both of its edges. In such a configuration, feeder roller 130 may take the form of a sprocket that may engage with the one or more openings 134 to move carrier tape 182 in the direction from adjacent first side 112 towards second side 114. Spool 103 may revolve around spindle 144, which may be configured to support one or more additional spools 103 of carrier tape 182 in addition to a primary spool 103 that may be currently used to base packaging consumable 42. Like packaging system 40, packaging system 50 may include one or more arms or mechanical devices (not shown) that may be configured to automatically retrieve carrier tape 182 from a spare spool 103 when the primary spool 103 is exhausted. Although FIG. 3 illustrates carrier tape 182 stored in the form of spool 103, it is contemplated that in some exemplary embodiments, carrier tape 182 may be stored within kiosk 10 in the form of a folding stack instead of being wound on spool 103.

Mold assembly 180 may include mold cavity 184, mold cavity arm 186, heater 188, vacuum pump 190, and duct 192. Mold cavity 184 may include a recess or hollow enclosure having a shape corresponding to a desired shape of base packaging consumable 42. In one exemplary embodiment, mold cavity 184 may have a generally cuboidal shaped recess configured to form a rectangular or square enclosure similar to recess 142. It is contemplated, however, that mold cavity 184 may have a recess having a cylindrical, a polygonal, or any other desired shape.

Heater 188 of mold assembly 180 may be positioned adjacent carrier tape 182. As illustrated in FIG. 5, heater 188 may be positioned above carrier tape 182. It is contemplated, however, that in some exemplary embodiments, heater 188 may be positioned below carrier tape 182 or on both sides of carrier tape 182. Heater 188 may include heating elements similar to those disclosed with respect to heater 107 of packaging system 40. Heater 188 may be configured to heat carrier tape 182, which may cause carrier tape 182 to soften and or to melt and to flow into mold cavity 184.

Mold cavity 184 may include one or more openings (not shown). Vacuum pump 190 may be fluidly connected to the one or more openings of mold cavity 184 via duct 192. Vacuum pump 190 may be configured to extract air out of mold cavity 184 such that the softened carrier tape 182 in mold cavity 184 may be forced to adhere to one or more walls of mold cavity 184 to form base packaging consumable 42 having recess 142 in the shape of mold cavity 184. Mold cavity 184 may also include mold cavity arm 186, which may be configured to move mold cavity 184 towards and/or away from carrier tape 182. For example, after base packaging consumable 42 has been formed in mold cavity 184, mold cavity arm 186 may retract mold cavity 184 away from carrier tape 182 to allow base packaging consumable 42 to be released from mold cavity 184. It is also contemplated that in some exemplary embodiments, vacuum pump 190 may be reconfigurable to inject air into mold cavity 184 to help eject base packaging consumable 42 formed in mold cavity 184. It is further contemplated that in other exemplary embodiments, a compressor (not shown) may be included in packaging system 40 to inject compressed air into mold cavity 184 to eject base packaging consumable 42 formed in mold cavity 184.

Rotation of feeder roller 130 may cause base packaging consumable 42 formed in mold assembly 180 to be positioned adjacent chute 101 of item receiving station 172. Item receiving station 172 of packaging system 50 may be similar to item receiving station 120 of packaging system 40. Thus, for example, chute 101 may be configured to deliver item 32 into base packaging consumable 42 positioned adjacent delivery end 102 of chute 101.

Although a position of item receiving station 172 has been described as being between base forming station 170 and packaging station 174, it is contemplated that in some exemplary embodiments, item receiving station 172 may be located before base forming station 170. In these exemplary embodiments, item 32 may be placed by chute 101 on carrier tape 182, which may subsequently be positioned within mold assembly 180. In these exemplary embodiments, mold assembly 180 may not include mold cavity 184 and/or vacuum pump 190 or duct 192. Instead, mold cavity 184 may be replaced by a mold platform that may support carrier tape 182 within mold assembly 180. Heater 188 of mold assembly 180 may be configured to heat carrier tape 182 such that carrier tape 182 may soften and/or melt and form a depression around item 32 placed on carrier tape 182. The depression may have a shape defined by a shape of item 32. For example, when item 32 is a key, the depression formed in carrier tape 182 may have a shape corresponding to a shape of a perimeter of the key.

Packaging station 174 may include spool 104, compression roller 138, support platform 140, and printer 194. Spool 104, compression roller 138, and support platform 140 may have structures and functions similar to those discussed above with respect to, for example, packaging system 40. Compression roller 138 and support platform 140 may be configured to compress and attach cover tape 44 and base packaging consumable 42 to each other in a manner similar to that discussed above with respect to, for example, packaging system 40.

Printer 194 may be positioned between compression roller 138 and cutter assembly 108 and may be configured to print textual and/or image information on package 34. For example printer 194 may be configured to print branding information, warranty information, instructions, and/or advertising information on package 34. It is also contemplated that in some exemplary embodiments, printer 194 may be configured to print a barcode representing pricing and/or other information on package 34. In yet other exemplary embodiments, printer 194 may be configured to print and/or attach a label, including a barcode, warranty information, instructions, and/or advertising information, on package 34.

Package delivery station 176 of packaging system 50 may be similar to package delivery station 124 of packaging system 40. Thus, for example, cutter assembly 108 may be configured to create perforated tear lines 150 (see FIG. 5) along a width of package tape 46 and on either side of package 34. Cutter assembly 108 may also be configured to cut or sever package 34 from package tape 46. The one or more severed packages 34 may travel over delivery chute 109 to bin 20 of kiosk 10.

In addition to sensors 152 and 154, packaging system 50 may also include one or more sensors 196, which may have characteristics similar to those described above with respect to, for example, sensors 152 and 154. Sensor 196 may be configured to detect whether carrier tape 182 is positioned within mold assembly 188. As discussed above, in some exemplary embodiments, one or both of carrier tape 182 and cover tape 44 may include one or more index marks 198. One or more of sensors 152, 154, and 196 may be configured to detect the presence of the one or more index marks 198 in addition to or as an alternative to detecting the presence of item 32 and/or package 34.

Packaging system 50 may also include controller 160, which may have a structure and functions similar to those described above in connection with packaging system 40. Controller 160 may be configured to receive and/or send signals to one or more of cutter assembly 108, feeder rollers 130 and 132, compression roller 138, sensors 152, 154, and 196, and other components of base forming station 170, item receiving station 172, packaging station 174, and package delivery station 176.

It is contemplated that in some exemplary embodiments, one or more of feeder rollers 130, 132, and/or compression roller 138 may take the form of sprockets and packaging system 50. Additionally, although, FIG. 6 illustrates one each of various components, it is contemplated that packaging system 50 may include only some of the components described above and illustrated in FIG. 6. It is further contemplated that packaging system 50 may include any number of each of the various components (e.g. spools 103, 104, feeder rollers 130, 132, heater 188, etc.).

In operation, sensor 196 may detect a presence of carrier tape 182 in mold assembly 180. Controller 160 may direct heater 188 to heat carrier tape 182 and vacuum pump 190 to extract air from mold cavity 184. Carrier tape 182 may soften or melt on being heated by heater 188 and may take the shape of mold cavity 184 because of the vacuum created by vacuum pump 190 in mold cavity 184. Controller 160 may direct mold cavity arm 186 to retract mold cavity 184 so as to release base packaging consumable 42 formed in mold cavity 184. Controller 160 may also direct feeder roller 130 to advance carrier tape 182 towards second side 114. Sensor 152 may detect that base packaging consumable 42 is positioned adjacent delivery end 102 of chute 101 and cause chute 101 to deliver item 32 to recess 142 of base packaging consumable 42. Sensor 152 may send a signal to controller 160 when it detects the presence of item 32 in base packaging consumable 42. controller 160 may direct feeder roller 132 to advance cover tape 44 so that cover tape 44 may be positioned to cover base packaging consumable 42, containing item 32. Controller 160 may further direct one or more of feeder rollers 130 and 132 to rotate such that base packaging consumable 42 and cover tape 44 positioned over base packaging consumable 42 pass between compression roller 138 and support platform 140, causing base packaging consumable 42 and top packaging consumable 44 to be sealingly attached to each other, forming package 34. Sensor 154 may detect the presence of package 34 adjacent cutter assembly 108. Sensor 154 may send a signal to controller 160 when it detects the presence of package 34. Controller 160 may send signals to upper and lower cutters 146 and 148, which in turn may generate tear lines 150 on either side of package 34 and may further sever package 34 from carrier tape 182 and cover tape 44, and/or from package tape 46, allowing package 34 to be delivered to bin 20 via delivery chute 109.

Figure 7:
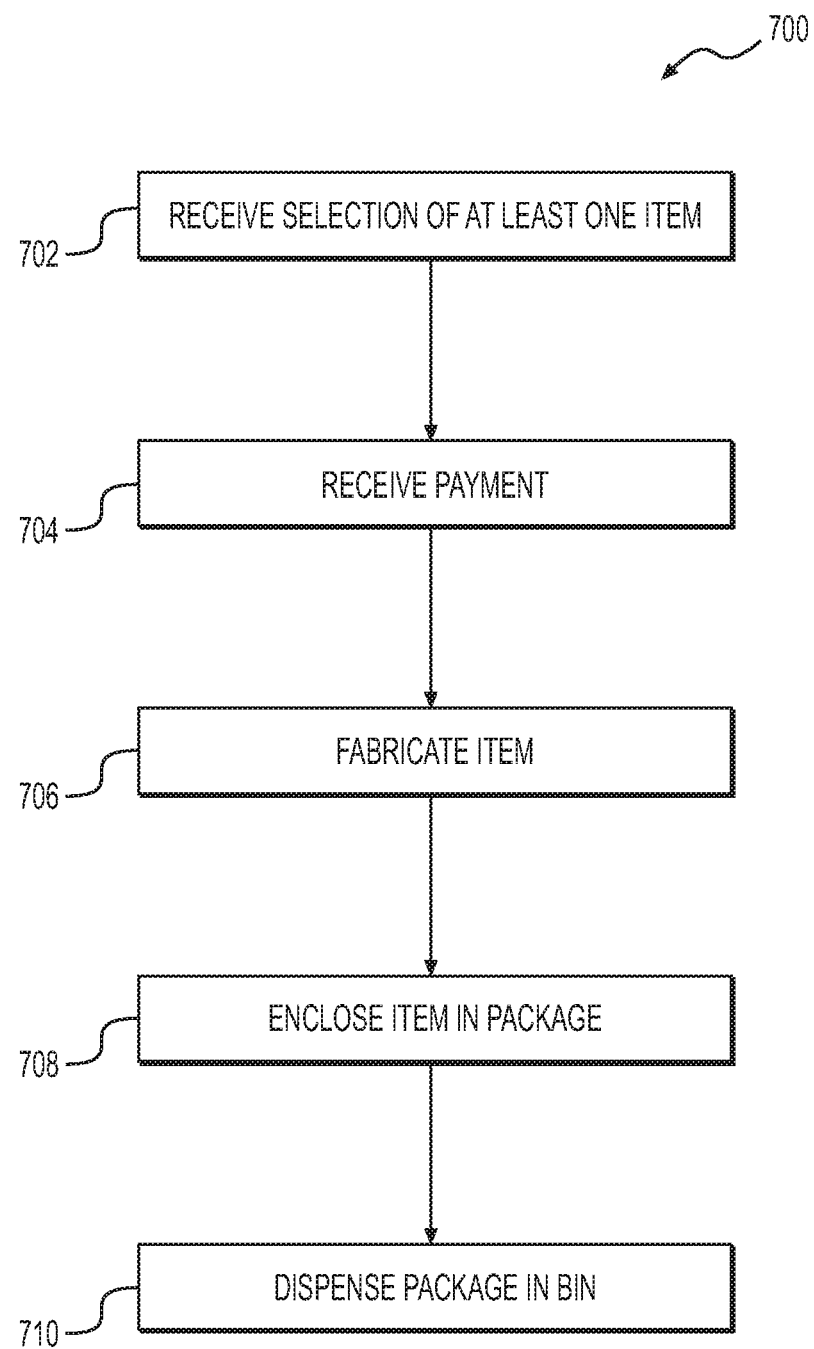
FIG. 7 is a flowchart illustrating an exemplary method of automatically packaging a custom-fabricated item in the self-service kiosk of FIG. 1.

FIG. 7 illustrates an exemplary method 700 of automatically packaging a pre-fabricated or custom-fabricated item 32 in a self-service kiosk. The order and arrangement of steps of method 700 is provided for purposes of illustration. As will be appreciated from this disclosure, modifications may be made to method 700 by, for example, hiding, or combining, removing, and/or rearranging the steps of method 700. Method 700 may be executed by controller 160.

Method 700 may include a step of receiving selection of at least one item 32 (step 702). Selection of the at least one item 32 may be received by controller 160 based on inputs received from a user. For example, a user may make a selection of the at least one item 32 from a plurality of items displayed on display 16 of kiosk 10. The user may make the selection using a user interface (e.g. graphical using user interface 24 and/or any of the physical or virtual input devices) of kiosk 10. For example, when display 16 is a touch screen device, the user may select the at least one item 32 by touching a portion of graphical user interface 24 associated with item 32, and/or by using a physical or virtual keyboard or numeric keypad to input user selection of item 32. It is contemplated that in some exemplary embodiments, kiosk 10 may additionally or alternatively include other types of input devices that may allow a user to select the at least one item 32. For example such input devices may include one or more mice, physical keyboards, joysticks, buttons, levers, microphones, gesture sensing devices, etc.

Method 700 may include a step of receiving payment from the user for the selected item 32 (step 704). In one exemplary embodiment, controller 160 may receive signals from the one or more of the input devices associated with kiosk 10 indicating selection of item 32 by a user. Controller 160 may display a price for the selected item 32 on display 16 of kiosk 10. Controller 160 may additionally or alternatively provide instructions to the user regarding using payment device 14 for making a payment for purchase of item 32. The user may make the payment using a credit or debit card, cash, check, etc., using payment device 14. Controller 160 may receive a signal from payment device 14 indicating that the user has made a payment corresponding to the displayed price of item 32.

Method 700 may include a step of fabricating item 32 (step 706). Controller 160 may execute one or more instructions stored in memory 164 to generate signals for controlling the one or more components of fabrication system 30 to fabricate item 32. Alternatively, when a user selects a pre-fabricated item stored in kiosk 10, controller 160 may instead generate signals to retrieve pre-fabricated item 32 from one or more storage areas within kiosk 10. Controller 160 may also generate signals that may cause either a pre-fabricated item 32 or a custom-fabricated item 32 to be dispensed to packaging system 40 or packaging system 50 of kiosk 10.

Method 700 may include a step of enclosing item 32 in package 34 (step 708). In step 708, controller 160 may execute one or more instructions stored in memory 164 to generate signals for controlling one or more components of packaging system 40 or packaging system 50 to sealingly enclose item 32 in package 34. Method 700 may also include a step of dispensing package 34 in bin 20 (step 710). Package 34 may be dispensed via exit chute 109 into bin 20 where the user may be able to access and retrieve package 34.

In some exemplary embodiments, the user may be able to determine whether or not to receive item 32 in package 34. For example, controller 160 may display instructions on display 16, allowing a user to opt out of receiving a packaged item 32. In such embodiments, based on a user selection, controller 160 may be configured to control the components of kiosk 10 such that pre-fabricated or custom-fabricated item 32 may be dispensed in bin 20 without being packaged in package 34 by packaging system 40 or 50. Thus, for example, in these embodiments, controller 160 may not execute steps 706 and 708 of method 700.

Figure 8:
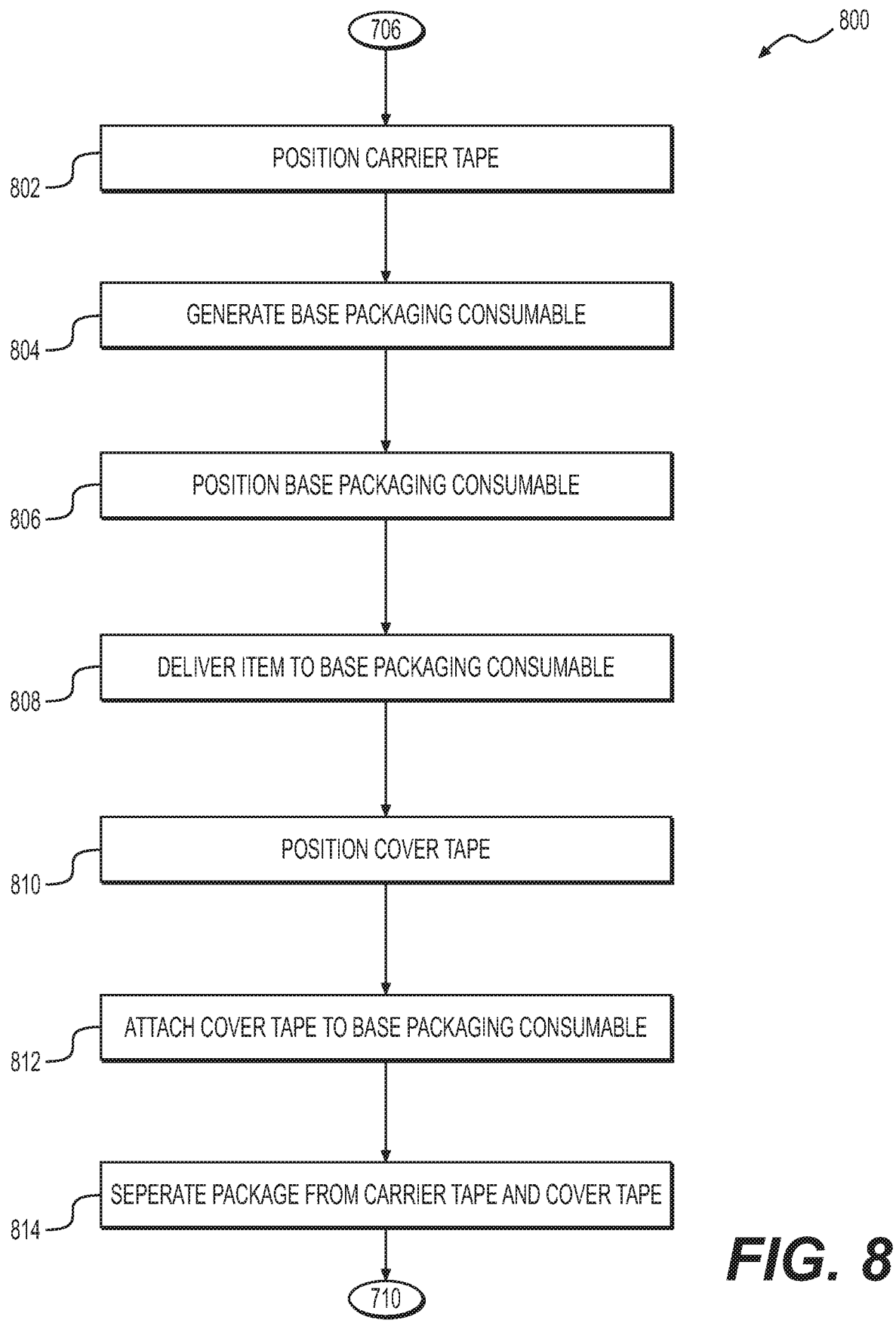
FIG. 8 is a flowchart illustrating an exemplary method of enclosing a custom-fabricated item in a package in the self-service kiosk of FIG. 1.

FIG. 8 illustrates an exemplary method 800 of enclosing item 32 in package 34. The order and arrangement of steps of method 800 is provided for purposes of illustration. As will be appreciated from the disclosure, modifications may be made to method 800 by, for example, adding, combining, removing, and/or rearranging the steps of method 800. Method 800 may be executed by controller 160. Method 800 and its steps are described below may be equally applicable to packaging system 40 and packaging system 50.

Method 800 may include a step of positioning carrier tape 182, for example, in mold assembly 180 (step 802). Controller 160 may execute instructions stored in memory 164 to generate signals that may direct one or more of feeder roller 130 and/or sprocket 105 to rotate and move carrier tape 182 in a direction from first side 112 to second side 114. Controller 160 may also monitor signals from sensor 196 to determine whether carrier tape 182 has been positioned in mold assembly 180. Sensor 196 may, for example, detect the presence of one or more indexing marks 198 on carrier tape 182 and generate signals indicating that carrier tape 182 is positioned in mold assembly 180.

Method 800 may include a step of generating base packaging consumable 42 (step 804). Controller 160 may execute instructions stored in memory 164 to generate signals to control one or more of heater 188 and vacuum pump 190. For example, controller 160 may cause heater 188 to be activated causing carrier tape 182 to be heated by heater 188. Before, during, or after, activating heater 188, controller 160 may activate vacuum pump 190, which may extract air from mold cavity 184 via duct 192. As a result, the softened carrier tape 182 may be pulled into mold cavity 184 and may take a shape of mold cavity 184, forming base packaging consumable 42.

Method 800 may include a step of positioning base packaging consumable 42, for example, adjacent chute 101 (step 806). Controller 160 may execute instructions stored in memory 164 to generate signals that may direct one or more of feeder roller 130 and/or sprocket 105 to rotate and move carrier tape 182, including base packaging consumable 42, in a direction from first side 112 to second side 114. Controller 160 may also monitor signals from sensor 152 to determine whether base packaging consumable 42 has been positioned adjacent chute 101. Sensor 152 may, for example, detect the presence of one or more indexing marks 198 on base packaging consumable 42 and generate signals indicating that base packaging consumable 42 is positioned adjacent chute 101.

Method 800 may include a step of delivering item 32 to base packaging consumable 42 (step 808). Controller 160 may execute instructions stored in memory 164 to generate signals to cause item 32 to be delivered to base packaging consumable 42 via chute 101. As discussed above, item 32 may be a pre-fabricated item or may be a custom-fabricated item produced by fabrication system 30.

Method 800 may include a step of positioning cover tape 44 (step 810). Controller 160 may monitor signals generated by sensor 152. Sensor 152 may be configured to generate a signal when sensor 152 detects the presence of item 32 in base packaging consumable 42, when base packaging consumable 42 is positioned adjacent chute 101. Controller 160 may receive the signal from sensor 182 indicating that item 32 is present in base packaging consumable 42. Controller 160 may execute instructions stored in memory 164 to generate signals that may direct one or more of feeder roller 132 and/or sprocket 105 to rotate so that cover tape 44 may be positioned to cover base packaging consumable 42 containing item 32. Controller 160 may also execute instructions stored in memory 164 to generate signals that may direct one or more of feeder rollers 130 and 132 and/or sprocket 105 to rotate and move both cover tape 44 and base packaging consumable 42 with item 32 in a direction from first side 112 to second side 114.

Method 800 may include a step of attaching cover tape 44 to base packaging consumable 42 (step 812). Controller 160 may be configured to execute instructions stored in memory 164 to adjust a gap between compression roller 138 and support platform 140 to compress cover tape 44 and base packaging consumable 42 such that cover tape 44 and base packaging consumable 42 may be sealingly adhered to each other to form package 34. In some exemplary embodiments, in which one or both of cover tape 44 and base packaging consumable 42 may include adhesive layers, applying pressure on covert tape 44 and base packaging consumable 42 may cause these 2 components to adhere to each other sealingly forming package 34. In other exemplary embodiments, controller 160 may be configured to execute instructions stored in memory 24 to cause an outer surface of compression roller 138 to be heated, causing cover tape 44 to soften and/or melt. Compression of the softened cover tape 44 and/or base packaging consumable 42 between compression roller 138 and supporting platform 140 may cause cover tape 44 to be sealingly attached to base packaging consumable 42, forming package 34.

Method 800 may include a step of separating package 34 from package tape 46 (step 814). Sensor 154 may detect the presence of package 34 adjacent cutter assembly 108. Sensor 154 may send a signal to controller 160 indicating that package 34 is positioned adjacent cutter assembly 108. Controller may receive the signal from sensor 154 and execute instructions stored in memory 164 to cutter assembly 108 to generate tear lines 150 across a width of package tape 46 on either side of package 34. Controller 160 may also cause cutter assembly 108 to sever package 34 from package tape 46 allowing package 34 to be delivered to deliver chute 109, which in turn may deliver package 34 to bin 20 where it may be accessed by a user. In is to be understood that in exemplary embodiments of kiosk 10, including packaging system 40, controller 160 may not execute steps 802 and 804 of method 800.

It will be apparent to those skilled in the art that various modifications and variations can be made to the disclosed cutting tool assembly. Other embodiments will be apparent to those skilled in the art from consideration of the specification and practice of the disclosed cutting tool assembly. It is intended that the specification and examples be considered as exemplary only, with a true scope being indicated by the following claims and their equivalents.

What is claimed is:

1. A self-service kiosk, comprising:
    a housing including a user interface configured to receive from a user a selection of at least one item and a payment for a purchase of the at least one item;
    a fabrication system disposed within the housing and configured to fabricate the at least one item;
    a packaging system disposed in the kiosk configured to:
        form a base packaging consumable using a carrier tape, the base packaging consumable including a recess configured to receive the at least one item; and
        sealingly attach a top packaging consumable to the base packaging consumable to enclose the at least one item in a package; and
    a bin configured to dispense the package, including the at least one item, to the user.

2. The self-service kiosk of claim 1, further including a door rotatably connected to the housing, the fabrication system being attached to the door.

3. The self-service kiosk of claim 1, wherein the packaging system includes:
    a chute configured to receive the at least one item from the fabrication system and deliver the at least one item to the base packaging consumable;
    a first spool configured to supply the top packaging consumable such that the top packaging consumable is positioned to cover the base packaging consumable containing the at least one item; and
    a compression roller configured to sealingly attach the top packaging consumable and the base packaging consumable to form the package.

4. The self-service kiosk of claim 3, further including a second spool configured to supply the base packaging consumable, the first spool and the second spool being positioned on opposite sides of the chute.

5. The self-service kiosk of claim 1, wherein the fabrication system includes one of a key duplicating system, a 3D printer, a laser cutter, or an engraving machine.

6. The self-service kiosk of claim 1, wherein the at least one item includes a giftable item.

7. The self-service kiosk of claim 1, wherein the top packaging consumable is a cover tape, and the packaging system includes:
    a lower spool configured to store and dispense the carrier tape;
    an upper spool configured to store and dispense the cover tape;
    a mold assembly configured to form the base packaging consumable using the carrier tape;
    a lower roller configured to move the carrier tape within the kiosk;
    a chute configured to deliver the at least one item to the base packaging consumable;
    an upper roller configured to position the cover tape to cover the base packaging consumable containing the at least one item;
    a compression roller configured to sealingly attach the cover tape to the base packaging consumable; and
    a cutter assembly configured to separate the package from the carrier tape and the cover tape; and
    a delivery chute configured to dispense the package to the bin.

8. The self-service kiosk of claim 7, wherein the chute is positioned between the mold assembly and the compression roller.

9. The self-service kiosk of claim 7, wherein at least one of the carrier tape or the cover tape includes an adhesive layer.

10. The self-service kiosk of claim 7, wherein the cover tape includes a thermoplastic material.

11. The self-service kiosk of claim 7, wherein the mold assembly includes:
    a mold cavity positioned on one side of the carrier tape;
    a heater positioned on an opposite side of the carrier tape and configured to heat the carrier tape; and
    a vacuum pump configured to extract air from the mold assembly such that the heated carrier tape enters the mold cavity to form the base packaging consumable.

12. The self-service kiosk of claim 11, further including:
    a sensor;
    a package tape roller configured to move at least one of the carrier tape and the cover tape within the kiosk;
    a controller configured to:
        receive a signal from the sensor; and
        control a rotation of at least one of the upper roller or the package tape roller to position the carrier tape on the mold cavity based on the received signal.

13. The self-service kiosk of claim 12, wherein
    the carrier tape includes at least one index mark; and
    the sensor is configured to generate the signal upon detection of the at least one index mark.

14. The self-service kiosk of claim 7, further including:
    an arm connected to the mold cavity, the arm configured to move the mold cavity relative to the carrier tape, wherein
    the controller is further configured to move the arm to retract the mold-cavity from the base packaging consumable.

15. A method of packaging a custom-fabricated item, the method comprising:
    providing a self-service kiosk including a user interface for receiving from a user a selection of at least one item;
    receiving, via the user interface, a payment for the purchase of the at least one item;
    fabricating the at least one item, using a fabrication system disposed within the kiosk;
    packaging the at least one item in a package, using a packaging system disposed in the kiosk, by:
        forming a base packaging consumable using a carrier tape, the base packaging consumable including a recess configured to receive the at least one item; and
        sealingly attaching a cover tape to the base packaging consumable to enclose the at least one item in a package; and
    dispensing the package to a bin in the kiosk, the bin being accessible by the user.

16. The method of claim 15, wherein packaging the at least one item further includes:
    delivering via a chute the at least one item from the fabrication system to the base packaging consumable; and
    positioning, using a roller, the cover tape to cover the base packaging consumable containing the at least one item.

17. The method of claim 16, further including:
generating, using a cutter assembly, at least one perforated tear line on at least one side of the package;
separating, using the cutter assembly, the package from the carrier tape and the cover tape.

18. The method of claim 16, further including:
positioning, using a sprocket, the carrier tape on a mold cavity;
heating the carrier tape, using a heater, while the carrier tape is positioned on the mold cavity; and
extracting air from the mold cavity, using a vacuum pump to cause the heated carrier tape to enter the mold cavity, forming the base packaging consumable.

19. The method of claim 15, further including printing, using a printer disposed in the kiosk, at least one of a label, a barcode, or instructions on the package.

20. The method of claim 15, wherein fabricating the at least one item includes fabricating a duplicate key based on a key provided by the user.

* * * * *

UNITED STATES PATENT AND TRADEMARK OFFICE
CERTIFICATE OF CORRECTION

PATENT NO. : 10,854,035 B2
APPLICATION NO. : 16/293891
DATED : December 1, 2020
INVENTOR(S) : Andy Volkmann et al.

Page 1 of 1

It is certified that error appears in the above-identified patent and that said Letters Patent is hereby corrected as shown below:

In the Claims

In Claim 3, Column 17, Lines 39-40, after "the base packaging consumable", delete "to form the package".

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*